US009103687B1

(12) United States Patent
Loo et al.

(10) Patent No.: US 9,103,687 B1
(45) Date of Patent: Aug. 11, 2015

(54) LOCATING FUEL OPTIONS AND SERVICES

(71) Applicant: Allstate Insurance Company, Northbrook, IL (US)

(72) Inventors: William Loo, Arlington Heights, IL (US); Stephen Hughes, Belfast (GB); James Gillespie, Belfast (GB); Jennifer A. Brandmaier, Chicago, IL (US); Daniel Koza, Hinsdale, IL (US)

(73) Assignee: Allstate Insurance Company, Northbrook, IL (US)

( * ) Notice: Subject to any disclaimer, the term of this patent is extended or adjusted under 35 U.S.C. 154(b) by 172 days.

(21) Appl. No.: 13/683,449

(22) Filed: Nov. 21, 2012

(51) Int. Cl.
| | |
|---|---|
| G06F 19/00 | (2011.01) |
| G01C 21/34 | (2006.01) |
| G06Q 40/08 | (2012.01) |
| F17D 1/04 | (2006.01) |
| G06Q 10/06 | (2012.01) |

(52) U.S. Cl.
CPC .............. *G01C 21/3469* (2013.01); *F17D 1/04* (2013.01); *G06Q 10/06313* (2013.01); *G06Q 40/08* (2013.01)

(58) Field of Classification Search
CPC . G06Q 10/47; G06Q 10/06313; G06Q 40/08; G06Q 50/30; F17D 1/04; F17D 5/08; G01C 21/3469; G07C 5/08; H01M 8/04089; H01M 8/04694; H01M 8/04955; H01M 8/0656; H01M 8/184; H02J 3/14; H02J 3/38; H04L 63/102; Y02E 60/34; Y02E 60/528
USPC ........ 701/123, 201, 210; 705/4, 5, 7.11, 7.23; 726/28; 709/224; 700/286; 713/2; 703/8; 252/7; 307/11; 370/352; 379/102.03; 137/6; 359/237; 60/688; 345/440
See application file for complete search history.

(56) References Cited

U.S. PATENT DOCUMENTS

| 5,091,097 A | * | 2/1992 | Pennartz ........................... 252/7 |
| 6,591,185 B1 | | 7/2003 | Polidi et al. |

(Continued)

FOREIGN PATENT DOCUMENTS

JP          5142994          6/1993

OTHER PUBLICATIONS

Anonymous, "How To" SmartGas, Online website www.smartgasapp.com/how-to/, downloaded Mar. 20, 2012, 3 pages.

(Continued)

*Primary Examiner* — James Trammell
*Assistant Examiner* — Sanjeev Malhotra
(74) *Attorney, Agent, or Firm* — Banner & Witcoff, Ltd.

(57) ABSTRACT

Systems and methods may provide for generating and using information about fuel options along a predetermined route. An optimized fuel location server may use information related to the fuel efficiency in a given vehicle and information related to the amount of fuel currently present in a fuel tank associated with the vehicle to determine where along the predetermined route fuel will be required. The optimized fuel location server may also determine where the vehicle should stop for fuel to navigate the route in the lowest cost way possible. The optimized fuel location server may further consider user preferences, such as preferred fuel providers, in determining which fuel option should be used. Finally, the optimized fuel location server may be configured to send notifications (e.g., real-time, etc.) to a user device when the user device is within the vicinity of one or more fuel options.

21 Claims, 6 Drawing Sheets

(56) References Cited

U.S. PATENT DOCUMENTS

| | | | |
|---|---|---|---|
| 7,194,072 B2* | 3/2007 | Gamble | 379/102.03 |
| 7,444,237 B2 | 10/2008 | Dale | |
| 7,668,644 B2 | 2/2010 | Heft et al. | |
| 8,054,196 B2 | 11/2011 | Isaacson | |
| 2004/0249935 A1* | 12/2004 | Jackson et al. | 709/224 |
| 2005/0165511 A1* | 7/2005 | Fairlie | 700/286 |
| 2005/0246518 A1* | 11/2005 | Takahashi | 713/2 |
| 2006/0208571 A1* | 9/2006 | Fairlie | 307/11 |
| 2006/0239254 A1* | 10/2006 | Short et al. | 370/352 |
| 2007/0032941 A1* | 2/2007 | Allen | 701/123 |
| 2007/0136106 A1* | 6/2007 | Hart et al. | 705/4 |
| 2007/0175511 A1* | 8/2007 | Doerr et al. | 137/6 |
| 2007/0242339 A1* | 10/2007 | Bradley | 359/237 |
| 2007/0260438 A1* | 11/2007 | Langer et al. | 703/8 |
| 2007/0265744 A1 | 11/2007 | Nicolai | |
| 2007/0290039 A1 | 12/2007 | Pfleging et al. | |
| 2008/0016868 A1* | 1/2008 | Ochs et al. | 60/688 |
| 2009/0063045 A1* | 3/2009 | Figueroa et al. | 701/210 |
| 2009/0157289 A1* | 6/2009 | Graessley | 701/123 |
| 2011/0160992 A1* | 6/2011 | Crombez | 701/123 |
| 2011/0166774 A1* | 7/2011 | Schunder | 701/201 |
| 2011/0184770 A1* | 7/2011 | Schwarzmann et al. | 705/7.11 |
| 2011/0208551 A1* | 8/2011 | Johnson | 705/5 |
| 2012/0011594 A1* | 1/2012 | Nguyen | 726/28 |
| 2012/0139922 A1* | 6/2012 | Heo | 345/440 |
| 2012/0259665 A1* | 10/2012 | Pandhi et al. | 705/4 |
| 2013/0197791 A1* | 8/2013 | Struzik | 701/123 |
| 2013/0345956 A1* | 12/2013 | Struzik | 701/123 |
| 2014/0129281 A1* | 5/2014 | Struzik | 705/7.23 |

OTHER PUBLICATIONS

The Best Gas Price Apps to Save You Money!, Blog www.techtipsandtoys.wordpress.com/2012/03/01/the-best-gas-price-apps-to-hel-you-save-money/ Mar. 1, 2012, 3 pages.

* cited by examiner

LOCATING FUEL OPTIONS AND SERVICES

TECHNICAL FIELD

The present disclosure relates to systems and methods for determining information about fuel options along a route.

BACKGROUND

Current mapping/directions apparatuses that provide information related to the fueling of motor vehicles provide basic functions such as locating gas stations within a given zip code. Some systems also allow users to determine local gas station prices by zip code. However, conventional systems lack the ability to generate more personalized results for a given user and/or scenario.

Therefore, there is a need for optimized systems and methods for generating personalized information about fuel options along a given route and for leveraging this information to make recommendations on refueling.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the disclosure involve optimized systems and methods for determining information about fuel options along a given route, the price of fuel at one or more fuel vendors, and/or locations along a given route where fuel may be required.

In another aspect of the disclosure, an optimized fuel location server may generate and transmit fuel-related information, including notifications about the times of the year when fuel may be cheaper in general and/or at preferred vendors.

In another aspect, an optimized fuel location server may calculate the most cost-effective way of navigating a desired route and may generate data needed to create an interactive map. The interactive map may display starting, intermediate, and destination points along the route and may display the location of fuel vendors that should be used to result in the greatest cost savings when driving along the route. The optimized fuel location server may also transmit this data to one or more user devices.

Further aspects of the disclosure may be provided in a computer-readable medium having computer-executable instructions that, when executed, cause a computer, user terminal, or other apparatus to at least perform one or more of the processes described herein.

BRIEF DESCRIPTION OF THE DRAWINGS

All descriptions are exemplary and explanatory only and are not intended to restrict the disclosure, as claimed. The accompanying drawings, which are incorporated in and constitute a part of this specification, illustrate embodiments of the disclosure and, together with the description, serve to explain the principles of the disclosure. In the drawings:

DETAILED DESCRIPTION

In accordance with various aspects of the disclosure, methods, computer-readable media, and apparatuses are disclosed through which advanced recommendations related to fueling a motor vehicle may be made. In certain aspects, an optimized fuel location server may generate information related to what fuel options (e.g., gas stations, etc.) exist along a given route (e.g., for a road trip, from home to work, etc.) for the motor vehicle. By analyzing this information along with other information related to the amount of fuel in a fuel tank associated with the motor vehicle, the optimized fuel location server may further determine where along the route fuel may be required (e.g., when an empty fuel tank is imminent).

In addition, the optimized fuel location server may determine the price of fuel at a given fuel vendor and may generate notifications about the times of the year when fuel may be cheaper at preferred vendors. Further still, the optimized fuel location server may calculate the most cost-effective way of navigating a desired route by determining the location of the lowest cost fuel vendors along the route. This analysis may take into account any fuel vendors preferred by a given user, the location of a given fuel vendor in relation to the amount of fuel in a fuel tank associated with a vehicle moving along the route, and any preferences for how often a given user likes to refill a fuel tank (e.g., when the fuel tank is half-full, when the gas light comes on, etc.).

Figure 1:
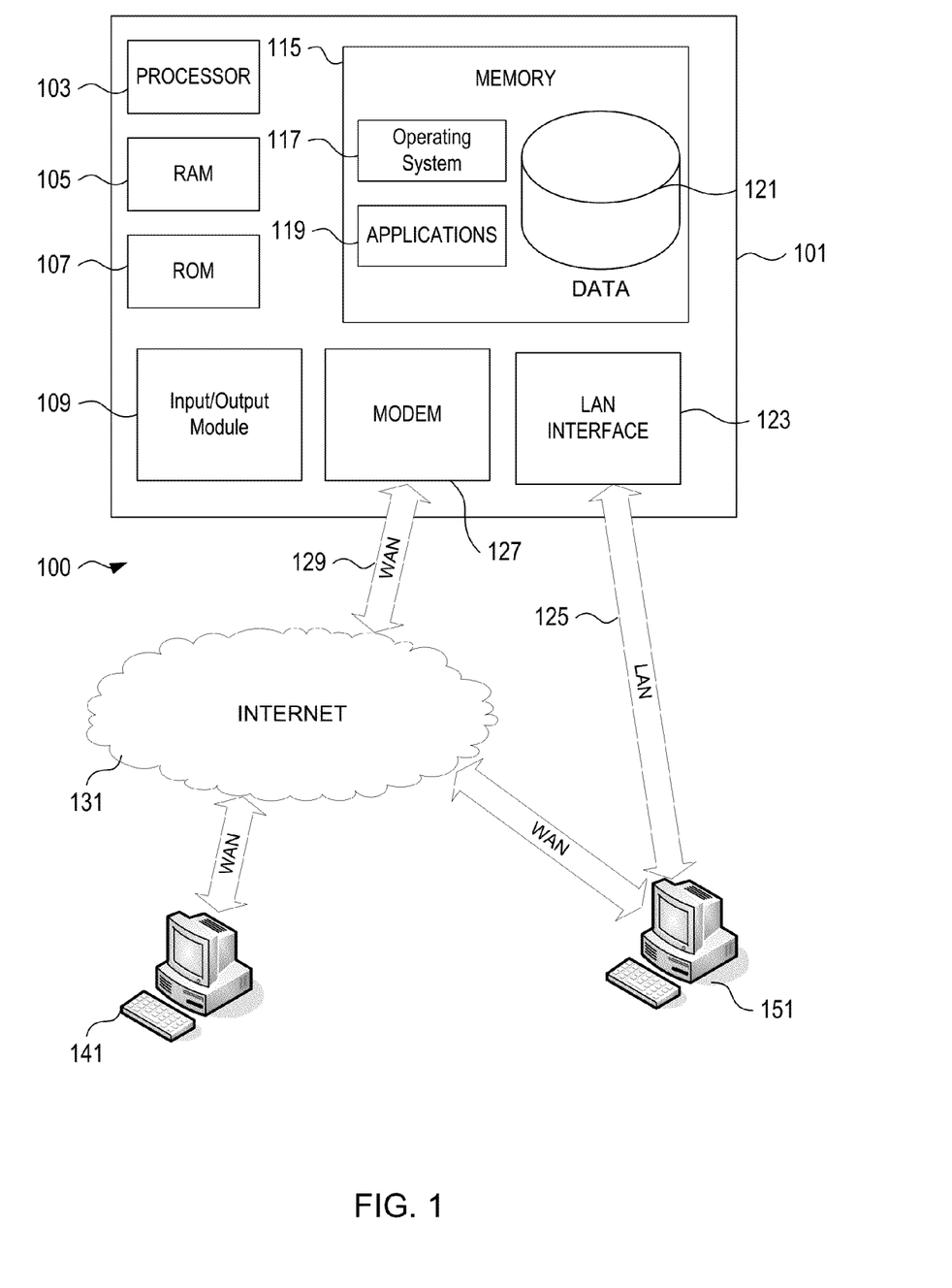
FIG. 1 shows an illustrative operating environment in which various aspects of the disclosure may be implemented.

FIG. 1 illustrates a block diagram of an optimized fuel location server 101 (e.g., a computer server) in communication system 100 that may be used according to an illustrative embodiment of the disclosure. The server 101 may have a processor 103 for controlling overall operation of the optimized fuel location server 101 and its associated components, including RAM 105, ROM 107, input/output module 109, and memory 115.

I/O 109 may include a microphone, keypad, touch screen, and/or stylus through which a user of optimized fuel location server 101 may provide input, and may also include one or more of a speaker for providing audio output and a video display device for providing textual, audiovisual, and/or graphical output. Software may be stored within memory 115 to provide instructions to processor 103 for enabling optimized fuel location server 101 to perform various functions. For example, memory 115 may store software used by the device 101, such as an operating system 117, application programs 119, and an associated database 121. Processor 103 and its associated components may allow the device 101 to run a series of computer-readable instructions to determine which fuel options exist along a given route. Processor 103 may also calculate the most cost-effective way of navigating a desired route using one or more fuel options along the route.

The optimized fuel location server 101 may operate in a networked environment supporting connections to one or more remote computers, such as terminals 141 and 151. The terminals 141 and 151 may be personal computers or servers that include many or all of the elements described above relative to the optimized fuel location server 101. Also, terminal 141 and/or 151 may be data stores for storing data related to gas stations present along a given route. In yet other embodiments, terminals 141 and 151 may represent various external systems (e.g., an external mapping system, databases associated with various fuel vendors, etc.) that interface with optimized fuel location server 101 to provide enhanced fuel location services.

The network connections depicted in FIG. 1 include a local area network (LAN) 125 and a wide area network (WAN) 129, but may also include other networks. When used in a LAN networking environment, the optimized fuel location server 101 is connected to the LAN 125 through a network interface or adapter 123. When used in a WAN networking environment, the optimized fuel location server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the optimized fuel location server 101 according to an illustrative embodiment of the disclosure may include computer executable instructions for invoking functionality related to determining the price of fuel at a given fuel vendor along a given route.

Optimized fuel location server 101 and/or terminals 141 or 151 may also be mobile terminals including various other components, such as a battery, speaker, camera, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions being executed by a computer. The disclosure may also be practiced in distributed computing environments where tasks are performed by remote processing devices that are linked through a communications network. In a distributed computing environment, computer-executable instructions may be located in both local and remote computer storage media including non-transitory memory storage devices, such as a hard disk, random access memory (RAM), and read only memory (ROM).

Figure 2:
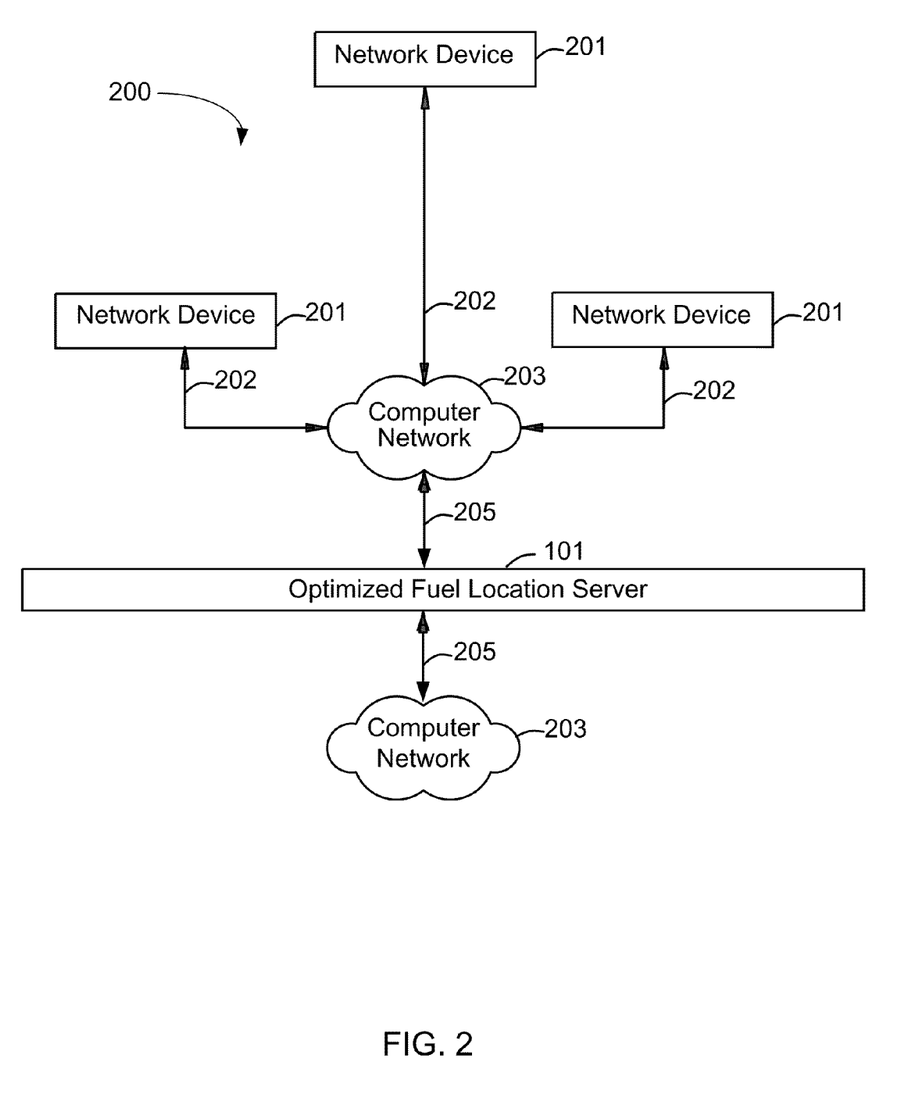
FIG. 2 shows a system of network devices and servers that may be used to implement the processes and functions of certain aspects of the present disclosure.

Referring to FIG. 2, a system 200 for implementing methods according to the present disclosure is shown. As illustrated, system 200 may include one or more network devices 201. Devices 201 may be local or remote, and are connected by one or more communications links 202 to computer network 203 that is linked via communications links 205 to optimized fuel location server 101. In certain embodiments, network devices 201 may run different algorithms used by optimized fuel location server 101 for determining the most cost-effective route from one location to another or, in other embodiments, network devices 201 may be data stores and/or databases for storing details related to the amount of fuel stored in fuel tanks associated with various types of vehicles. In yet other embodiments, network devices 201 may represent user devices configured to transmit fuel data from a user to optimized fuel location server 101. In system 200, optimized fuel location server 101 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between network devices 201 and optimized fuel location server 101, such as network links, dial-up links, wireless links, hard-wired links, etc.

The steps that follow in the Figures may be implemented by one or more of the components in FIGS. 1 and 2 and/or other components, including other computing devices.

Optimized fuel location server 101 may be managed by various types of entities, including businesses, governmental agencies, nonprofit organizations, etc. In one embodiment, optimized fuel location server 101 may be managed by an insurance company seeking to provide enhanced fuel location services to its customers.

Figure 3:
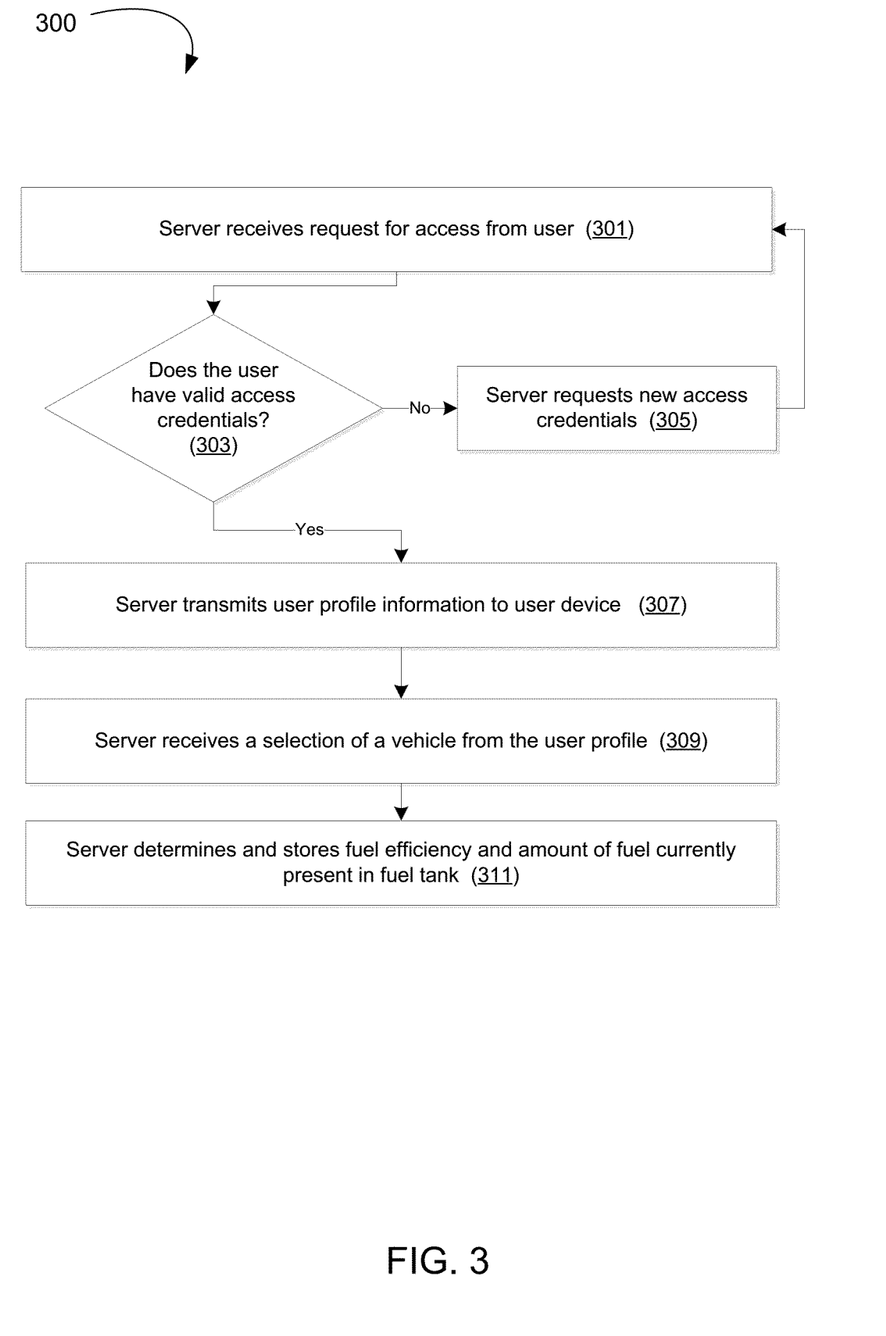
FIG. 3 shows a process flow for receiving information about vehicles associated with one or more users, in accordance with certain aspects of the present disclosure.

FIG. 3 shows a process flow for receiving information about vehicles associated with one or more users, in accordance with at least one aspect of the present disclosure. The process 300 may start out at step 301 where one or more users may attempt to access enhanced fuel location services associated with an optimized fuel location server 101. Users may access this information through a variety of computing devices, including a personal computer, mobile device, tablet, etc. and through various communication platforms, including the Internet. For instance, using a desktop computer, users may access information previously created and stored via a mobile device, and vice versa. Users may also store data (e.g., about a given vehicle) in a network storage (e.g., database 201) that may be accessed by multiple types of user devices. A user may enter login access credentials (e.g., username, password, etc.) via a user interface (e.g., a customized graphical user interface such as a website depending on the type of device a user is using to access optimized fuel location server 101).

Then, in step 303, processor 103 of optimized fuel location server 101 may process these credentials to authenticate the user. If the access credentials are not valid, optimized fuel location server 101 may request the user to enter new login credentials in step 305. The process may then move back to step 301 where optimized fuel location server 101 may receive new access credentials from the user.

If the user provides valid access credentials in step 303, optimized fuel location server 101 may retrieve an associated user profile in step 307 and transmit information related to the user profile to the user device (e.g., for display on a display associated with the user device). The user profile may include various details about the user, including a name, address, age, and list of vehicles associated with the user. If a user does not have a user profile, optimized fuel location server 101 may request that the user create a new profile. A newly created profile may be associated with previously-created and/or newly-created access credentials. In addition, optimized fuel location server 101 may also allow for the creation of a profile/access credentials for a group of users, such as a household, family, friends circle, etc. In this instance, optimized fuel location server 101 may allow each member of the group to access and/or update profile information related to the group.

Once a user profile has been retrieved and/or created, optimized fuel location server 101 may transmit information to allow the user device to display a list of one or more vehicles associated with the user profile. Optimized fuel location server 101 may also present the user with various details (e.g., make, model, year of manufacture, etc.) associated with each vehicle in the list. This information may have been added to the user profile at any given time, including at a time when the vehicle itself was initially associated with the user profile and/or at any given time thereafter. These vehicles may represent vehicles owned and/or operated by the user. In one embodiment, where the entity managing optimized fuel location server 101 is an insurance company, the list of vehicles associated with a given user profile may represent vehicles that are insured by the insurance company. In this embodiment, optimized fuel location server 101 may also retrieve and transmit information that causes the user device to display an insurance policy number of each insured vehicle associated with the user profile (e.g., by cross-referencing the user profile information with associated insurance policies in a database maintained by the insurance company).

If the user profile is not associated with any vehicles, optimized fuel location server 101 may request that the user add one or more vehicles to the user profile. A user may then add one or more vehicles to a user profile using a user interface associated with a user device.

Once there is at least one vehicle associated with the user profile, the process of FIG. 3 may move to step 309 where the user may select a vehicle that should be analyzed by optimized fuel location server 101. When a user selects one of the vehicles associated with the user profile, the process may move to step 311 where optimized fuel location server 101 may use vehicle details (e.g., make, model, year of manufacture) to determine the fuel efficiency (e.g., miles capable of being driven per gallon of fuel, etc.) of the vehicle. Optimized fuel location server 101 may also communicate with a user associated with the vehicle to determine and store (e.g., in an associated memory such as database 201) the fuel efficiency and other information, including information about the amount of fuel currently present in a fuel tank of the vehicle and information about driving patterns and/or vehicle statistics (e.g., tire pressure, engine efficiency, etc.) that may impact how often a given user may need fuel.

In one aspect, optimized fuel location server 101 may direct the user device to capture and transmit data (e.g., a photo of a fuel pump display) that details the amount of fuel purchased by the user at the most recent fuel stop. Optimized fuel location server 101 may analyze this data along with other received/calculated information related to the fuel efficiency of the vehicle, the amount of fuel still in the fuel tank at the most recent refueling stop, the odometer reading of the vehicle at the most recent refueling stop, and the current odometer reading of the vehicle to determine the amount of fuel currently in the vehicle.

For instance, assume that the fuel efficiency of a particular vehicle is 20 miles per gallon of fuel and that the vehicle was most recently refilled with 10 gallons of fuel (initially empty tank). Assume also that the odometer reading was 82,100 miles at the time at which the vehicle was most recently refueled and that the odometer reading is currently 82,200 miles. Optimized fuel location server 101 may determine that the vehicle was driven 100 miles since the last refueling (82,200 miles−82,100 miles=100 miles) and may then determine that the vehicle has 5 gallons of fuel left in the fuel tank (10 gallons initially present−(100 miles/20 miles per gallon)= 5 gallons).

In some aspects, optimized fuel location server 101 may determine the fuel efficiency and/or the current fuel tank level of a given vehicle by communicating with a server (e.g., a server associated with a car dealer, another server maintained by the entity managing optimized fuel location server 101, etc.) storing this information.

In other aspects, optimized fuel location server 101 may communicate with a computing device (e.g., an on-board diagnostic (OBD) system, etc.) directly associated with a given vehicle (e.g., after a user associated with the vehicle provides appropriate login credentials, etc.). In this aspect, optimized fuel location server 101 may not provide a list of vehicles associated with a given user profile. Rather, optimized fuel location server 101 may communicate directly with the OBD system to determine details (e.g., make, model, year of manufacture, fuel tank size, fuel efficiency, current fuel tank level, etc.) associated with the vehicle.

Figure 4:
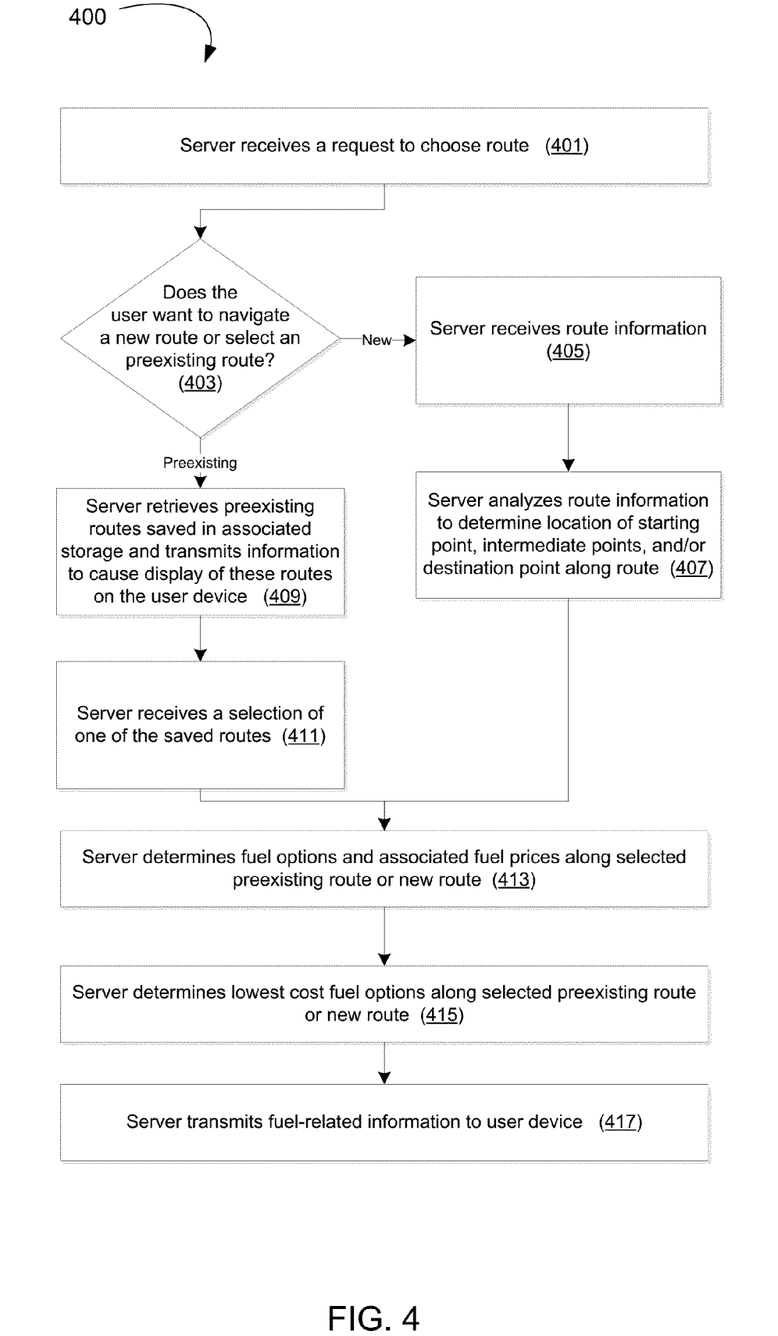
FIG. 4 shows a process flow for generating information about fuel options along a given route, in accordance with certain aspects of the present disclosure.

FIG. 4 shows a process flow for generating information about fuel options along a given route, in accordance with at least one aspect of the present disclosure. The process 400 may start out at step 401 where optimized fuel location server 101 may receive, from a user device, a request to choose a route. A route may be any path between two points and may include one or more intermediate stops.

Once a request to choose a route is received in step 401, optimized fuel location server 101 may decide if the request pertains to a new route and/or a preexisting route in step 403. Preexisting routes may represent routes that have been previously stored in a memory associated with optimized fuel location server 101 (e.g., database 201). These routes may be routes that have been previously used by a user associated with the request and may have been saved in database 201 after initial use. Meanwhile, new routes may represent routes that have not been previously saved in database 201.

If the request pertains to a preexisting route, the process may move from step 403 to step 409 where optimized fuel location server 101 may retrieve preexisting routes saved in database 201 and may transmit information to cause display of these routes on a display associated with the user device. The process may then move to step 411 where optimized fuel location server 101 may receive a selection of one of the saved routes (e.g., when a user of the user device clicks on a desired route shown on a display associated with the user device) for further processing.

If the request pertains to a new route, the process may move from step 403 to step 405 where optimized fuel location server 101 may receive route information. Route information may include information related to a starting point, any intermediate points along the route, and a destination point. Users may transmit route information to optimized fuel location server 101 in a variety of ways, including via email, text messaging, a telephone call, postal mail, etc. The information itself may include city and state information, street level information, and/or other types of information that is useful to unambiguously identify points along a given route. For instance, for a road trip from Chicago to Atlanta, users may transmit city and state information to optimized fuel location server 101. On the other hand, for a commute from home to work in the same city, users may transmit the street address of the home and the street address of an office building to optimized fuel location server 101.

Once optimized fuel location server 101 receives route information in step 405, the process may move to step 407 where optimized fuel location server 101 may analyze the route information (e.g., using predictive logic) and/or may communicate with one or more servers configured to execute a mapping service to determine the location of starting points, destination points, and any intermediate points along the route. The location of these points may refer to global positioning system (GPS) coordinates, latitude/longitude coordinates, etc. that may be used to precisely locate each point. Once the location of the points along a new route are determined, optimized fuel location server 101 may store the route in an associated memory (e.g., database 201) for future use. This information may already be stored in a memory associated with optimized fuel location server 101 for each of the preexisting routes.

Once optimized fuel location server 101 either receives a selection of a saved route in step 411 and/or analyzes route information to determine the location of points along a route in step 407, optimized fuel location server 101 may determine fuel options (e.g., gas stations, etc.) and associated fuel prices along the selected preexisting route or new route in step 413. Optimized fuel location server 101 may make this determination by communicating with other servers and/or databases (e.g., associated with various fuel vendors, third-party information resources, etc.). The process may then move to step 415 where optimized fuel location server 101 may also determine the lowest cost fuel options along a selected preexisting route or new route by further analyzing the information received through communications with other servers and/or databases. In some aspects, optimized fuel location server 101 may determine the lowest cost option along a given route; in other aspects, optimized fuel location server 101 may determine which fuel options along a route offer fuel for a price below a predetermined threshold value. This information may be stored in a database (e.g., database 201) associated with optimized fuel location server 101.

Finally, in step 417, optimized fuel location server 101 may transmit (e.g., as notifications, etc.) information generated/determined in steps 407, 411, 413, and 415 to a user device so that the user device can use the information to plot a map that depicts the location of the starting point, any intermediate points, the destination point, the various fuel options, and the lowest cost fuel options along the chosen route on a display associated with the user device. Once received, the information may also be stored in memory associated with the user device.

The information transmitted to the user device in step 417 may aid the user in avoiding a situation where he/she runs out of fuel while driving the vehicle along the route. This information may also help the user avoid insurance claims (e.g., caused by problems associated with lack of fuel, etc.) and may allow the user to have a personalized experience.

Figure 5:
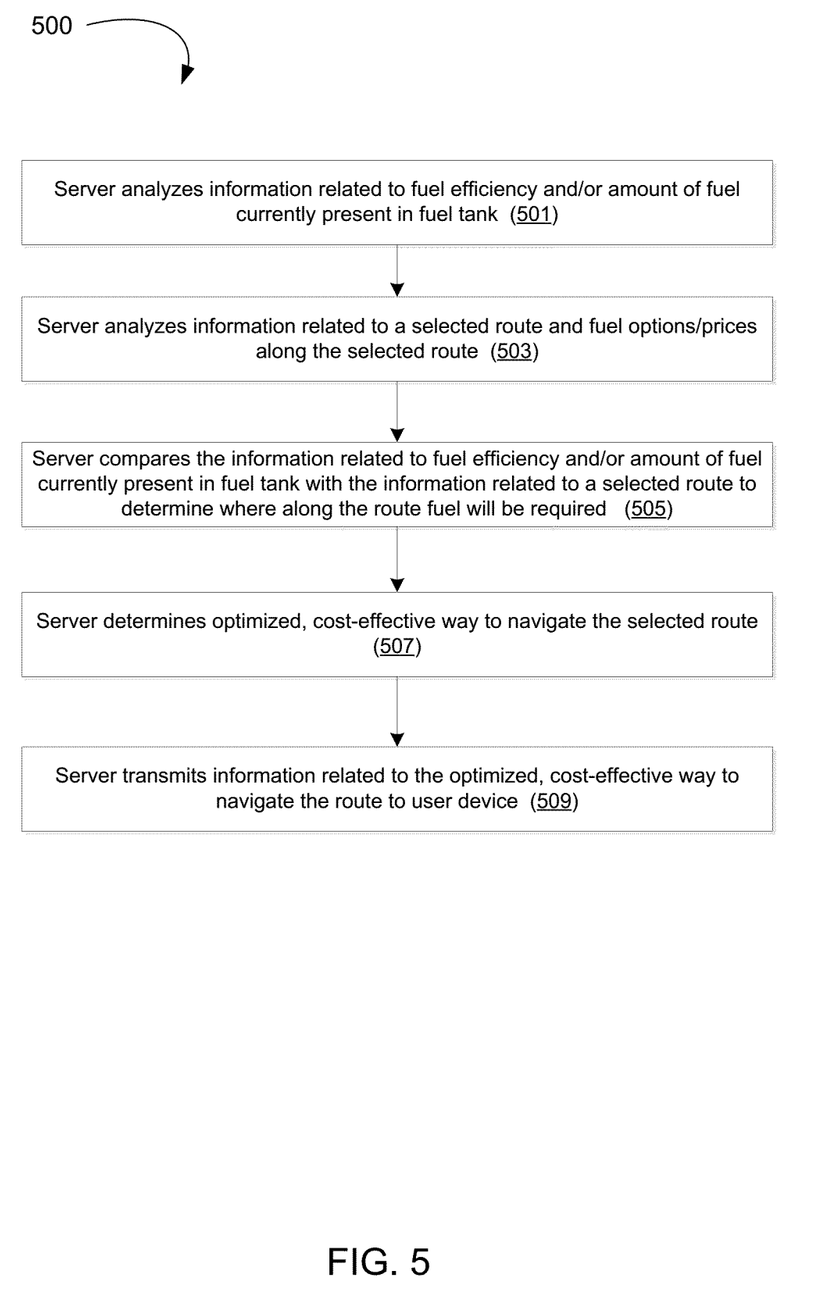
FIG. 5 shows a process flow for providing a user with information related to an optimized route, in accordance with certain aspects of the present disclosure.

FIG. 5 shows a process flow for providing a user with information related to an optimized route, in accordance with at least one aspect of the present disclosure. The process 500 shown in FIG. 5 may start out at step 501 where optimized fuel location server 101 may analyze information related to fuel efficiency and/or the amount of fuel currently present in a fuel tank associated with a given vehicle. Optimized fuel location server 101 may generate this information in a variety of ways, such as by the methodology described in FIG. 3. The process may then move to step 503 where optimized fuel location server 101 may analyze information related to a selected route, including information related to starting, intermediate, and destinations points, information related to fuel options along the selected route, and information related to the price of fuel associated with the fuel options. Optimized fuel location server 101 may determine this information in a variety of ways, such as by the methodology described in FIG. 4.

The process may then move to step 505 where optimized fuel location server 101 may compare the information analyzed in step 501 (e.g., information related to fuel efficiency and/or amount of fuel currently present in a fuel tank associated with a given vehicle) with the information analyzed in step 503 (e.g., information related to a selected route and fuel options and/or prices of fuel along the selected route) to determine where along the route fuel will be required if the vehicle analyzed in step 501 were to traverse the selected route. Once the points at which fuel will be required are determined, the process may move to step 507 where optimized fuel location server 101 may determine an optimized, cost-effective way to navigate the route by using the lowest cost fuel options along the selected route based on when the vehicle will need fuel.

Finally, in step 509, optimized fuel location server 101 may transmit information related to the optimized, cost-effective way to navigate route to a user device associated with a user of the vehicle. The user device may then plot the received route (e.g., as an interactive map with each recommended fuel option and associated details flagged on the map) on an associated display.

For instance, assume that a 220 mile road trip is being planned from New York City to Washington, D.C., with no intermediate stops and assume that there are gas stations every 10 miles along the route. Assume also that the car being used to traverse the route has a fuel efficiency of 20 miles per gallon, that the car has a 10 gallon fuel tank, and that the tank initially has 1 gallon of fuel.

Optimized fuel location server 101 may analyze this information to determine that a first fuel stop will be needed approximately 10 miles into the trip and that a second fuel stop will be needed approximately 200 miles into the trip. Optimized fuel location server 101 may also determine that in the vicinity of 10 miles into the trip, there are three gas stations—one that is 9.2 miles from the starting point, one that is 11.8 miles from the starting point, and one that is 13.8 miles from the starting point. Given that the gas station at 13.8 miles from the starting point offers the lowest cost fuel, optimized fuel location server 101 may determine that the first refueling stop should occur at 13.8 miles from the starting point. Optimized fuel location server 101 may also determine that in the vicinity of 200 miles into the trip, there are two gas stations—one that is 195.8 miles from the starting point and another that is 202.9 miles from the starting point. Given that the gas station at 195.8 miles from the starting point offers the lowest cost fuel, optimized fuel location server 101 may determine that the second refueling stop should occur at 195.8 miles from the starting point. In this way, optimized fuel location server 101 may match the fueling needs of a vehicle with the fuel options along a given route to guide the vehicle to the most optimal, cost-effective route.

In other aspects, optimized fuel location server 101 may also notify users (e.g., via push notifications to a mobile device associated with a given user) when they are within a predetermined distance of a given fuel provider. Optimized fuel location server 101 may customize the notification based on the type of mobile device to which the notification is being sent. Optimized fuel location server 101 may also determine that a given fuel provider is within a predetermined distance of the vehicle by determining the location (e.g., GPS coordinates, etc.) of the vehicle and the fuel provider. This functionality may either be built-in to the functionality of optimized fuel location server 101 and/or optimized fuel location server 101 may communicate with another server that provides this functionality.

The notification may include the location of one or more fuel providers and associated fuel prices at the fuel providers. For instance, optimized fuel location server 101 may notify users when they are within 5 miles of a fuel provider. In addition, optimized fuel location server 101 may apply other types of rules prior to notifying a given user about a fuel option. For instance, optimized fuel location server 101 may consider whether or not a given fuel provider is a preferred provider of the user (e.g., as detailed in the associated user profile).

Figure 6:
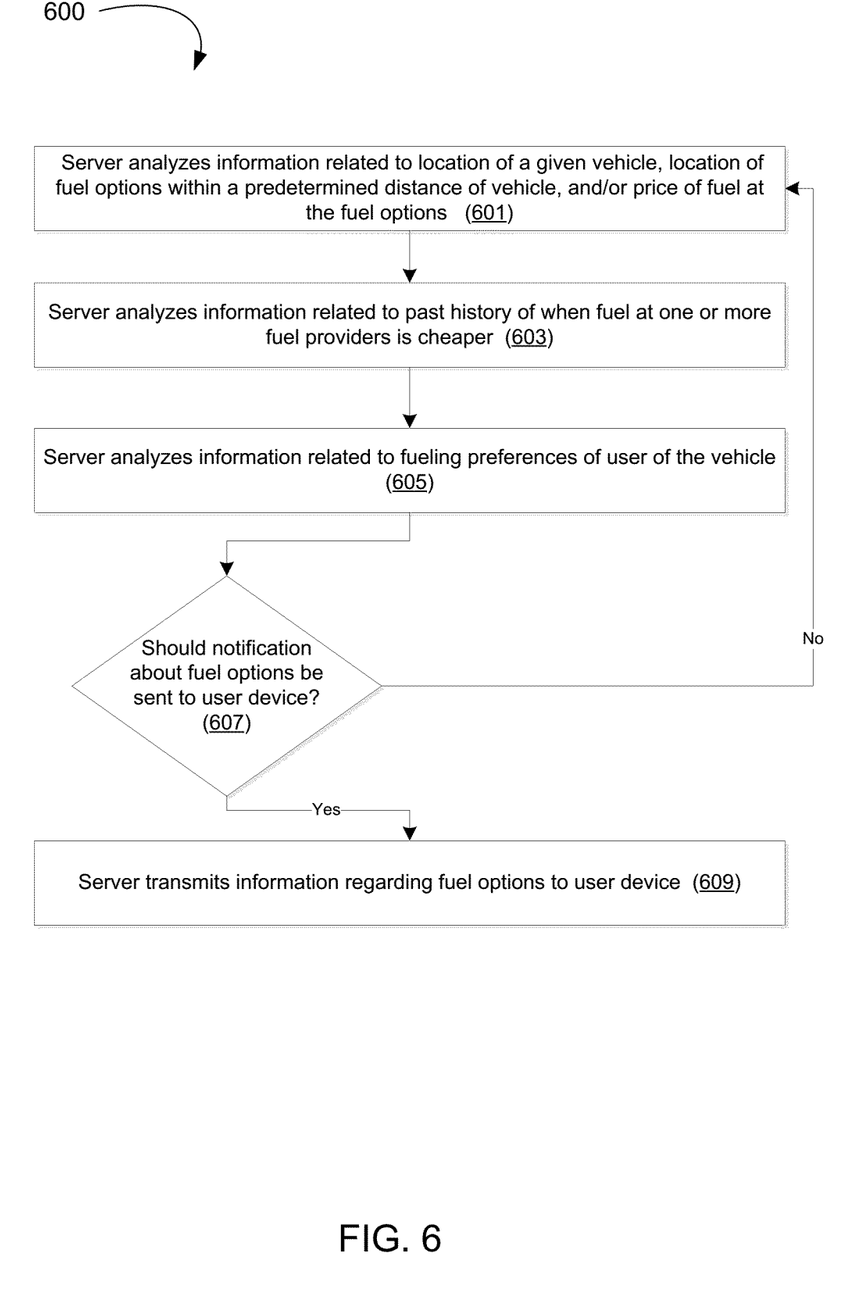
FIG. 6 shows a process flow detailing various factors that may be analyzed by an optimized fuel location server prior to notifying a given user about one or more fuel options, in accordance with certain aspects of the present disclosure.

FIG. 6 shows a process flow detailing various factors that may be analyzed by an optimized fuel location server 101 prior to notifying a given user about one or more fuel options, in accordance with at least one aspect of the present disclosure. The process 600 may start out at step 601 where optimized fuel location server 101 may analyze information related to the current location of a vehicle and the location of fuel (e.g., at gas stations, etc.) within a predetermined distance of the vehicle. Alternatively, optimized fuel location server 101 may analyze information related to those fuel options that are located in the vicinity of the vehicle and that offer fuel at a price that is less than a predetermined threshold price. Optimized fuel location server 101 may consider sending a notification of fuel options and associated fuel prices when the fuel options are either located within a predetermined distance of the vehicle and/or when the current price of fuel at a given vendor in the vicinity is below a predetermined threshold.

The process may then move to step 603 where optimized fuel location server 101 may analyze information related to the past history of when fuel at one or more fuel providers within a given area (e.g., in the vicinity of a given vehicle) is cheaper. For instance, optimized fuel location server 101 may determine that a given gas station usually has a sale on fuel during Labor Day weekend or that another gas station consistently offers cheaper fuel during the winter months. In this and other ways, optimized fuel location server 101 may include predictive logic to make fuel recommendations based on the likelihood of an event (e.g., such as a sale). The possibility of cheaper fuel prices at one or more fuel providers may trigger optimized fuel location server 101 to send a notification including this information to one or more users in the vicinity. Optimized fuel location server 101 may send the notification to the users with enough lead time so that the users can act on the notification before an event such as a sale ends.

The process may then move to step 605 where optimized fuel location server 101 may analyze information related to the fueling preferences of a user of the vehicle. The fueling preferences of a given user may be updated dynamically (e.g., by activating/deactivating a radio button on a screen associated with the user profile and/or tracked via past user behavior and inferred through business logic associated with processor 103 of optimized fuel location server 101). For instance, the user may prefer a predetermined fuel provider. In this case, optimized fuel location server 101 may analyze the prices of fuel only at the preferred provider and may consider sending the user a notification only when the price of fuel at the preferred provider is below a predetermined threshold. Or, the user may prefer to fuel the vehicle when the fuel tank is at a predetermine fuel level. For example, the user may prefer to fuel the vehicle when the fuel tank is half-empty. In this scenario, optimized fuel location server 101 may analyze potential fuel providers located in the vicinity of the vehicle and may consider sending the user a notification about prices of fuel in the vicinity only when this fuel level is reached.

The process may then move to step 607 where optimized fuel location server 101 may determine if a notification about one or more fuel options should be sent to a given user device based on the information analyzed in steps 601, 603, and 605. In determining if a notification should be sent, optimized fuel location server 101 may weight one or more types of information more heavily than other types of information. For instance, optimized fuel location server 101 may determine that a notification should be sent to a given user solely on the basis of location-based factors such as the current location of the vehicle in question and the location of one or more fuel options. In another example, optimized fuel location server 101 may consider both location-based factors and the preferences of the user in deciding whether or not to send a notification.

If optimized fuel location server 101 determines that a notification about fuel options should be sent to a user device in step 607, the process may move to step 609 where optimized fuel location server 101 may transmit information (e.g., as an email, SMS message, push notification, telephone call, etc.) regarding fuel options to a user device. The exact information transmitted to the user device may depend on the factors analyzed prior to transmitting the information. For instance, if only location-based factors were analyzed, optimized fuel location server 101 may transmit all fuel options (and associated information such as location and price) within a predetermined distance of the vehicle in question. If, however, location-based factors and other factors, such as the fueling preferences of the user associated with the vehicle, were analyzed, optimized fuel location server 101 may transmit a narrower selection of fuel options (and associated information such as location and price) consistent with both of these factors.

It should be noted that even though FIG. 6 describes three main types of information analyzed by optimized fuel location server 101, other types of information may be analyzed prior to determining if a notification should be sent to a user device associated with a user. It should also be noted that optimized fuel location server 101 may analyze only a portion of the information in one or more of the steps shown in FIG. 6 prior to sending a notification about fuel options to a user.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, the described implementation includes software but the present disclosure may be implemented as a combination of hardware and software or in hardware alone. Additionally, although aspects of the present disclosure are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM.

What is claimed is:

1. A method comprising:
   receiving, at an optimized fuel location server, valid access credentials for access to the optimized fuel location server;

retrieving, at the optimized fuel location server, a user profile associated with the valid access credentials;

receiving, at the optimized fuel location server, a selection of one of a plurality of vehicles associated with the user profile;

receiving, at the optimized fuel location server from an on-board diagnostic (OBD) system, an amount of fuel currently present in a fuel tank associated with the one of the plurality of vehicles;

determining, at the optimized fuel location server, a fuel efficiency of the one of the plurality of vehicles;

receiving, at the optimized fuel location server, a selection of one of a plurality of routes from a first location to a second location;

determining, at the optimized fuel location server, a plurality of fuel options along the selected route;

based on the fuel efficiency and the amount of fuel currently present in the fuel tank, determining where along the selected route fuel will be required; and calculating an optimized, cost-effective way of navigating the selected route using at least one of the plurality of fuel options based on a result of determining where along the selected route fuel will be required.

2. The method of claim 1, further comprising: transmitting information related to the optimized, cost-effective way of navigating the selected route to a user device associated with the user profile.

3. The method of claim 2, wherein the information related to the optimized, cost-effective way of navigating the selected route is configured to allow the user device to cause display of an interactive map detailing the selected route and the at least one of the plurality of fuel options.

4. The method of claim 1, wherein the fuel efficiency is determined through communication with an on-board diagnostic (OBD) system associated with the one of the plurality of vehicles.

5. The method of claim 1, wherein the plurality of fuel options comprise a plurality of gas stations.

6. The method of claim 1, further comprising:
prior to receiving the selection of one of the plurality of vehicles associated with the user profile, searching a database of an insurance company based on the user profile to identify a plurality of vehicles insured by the insurance company as the plurality of vehicles.

7. The method of claim 1, wherein the selected route comprises a preexisting route stored in a memory associated with the optimized fuel location server.

8. The method of claim 1, wherein the selected route comprises a new route mapped by the optimized fuel location server.

9. The method of claim 8, further comprising: determining, at the optimized fuel location server, a latitude and a longitude coordinate of the first location and the second location on the new route.

10. The method of claim 9, further comprising: storing the new route in a memory associated with the optimized fuel location server.

11. The method of claim 1, further comprising: receiving information, at the optimized fuel location server, related to prices of fuel at the plurality of fuel options.

12. The method of claim 1, wherein determining where along the selected route fuel will be required is further based on an average fuel level at which a user associated with the user profile refuels the fuel tank.

13. The method of claim 1, wherein the calculating optimized, cost-effective way of navigating the selected route comprises determining to stop at a first fuel option and a second fuel option and passing a third fuel option and fourth fuel option based on a comparison of a first total cost of navigating the selected route using the first fuel option and the second fuel option with a second total cost of navigating the selected route using the third fuel option and the fourth fuel option, wherein the first fuel option, the second fuel option, the third fuel option, and the fourth fuel option are different fuel options among the plurality of fuel options.

14. A system comprising:
an on-board diagnostic (OBD) system configured to:
determine an amount of fuel currently present in a fuel tank associated with a vehicle; and
transmit the amount of fuel currently present in the fuel tank;
a processor; and
a memory storing computer-readable instructions that, when executed by the processor, cause an apparatus at least to:
receive a request to drive the vehicle along a new route that includes a plurality of fuel options;
access a user profile associated with a user device from which the request is transmitted;
map the new route on a map;
receive the amount of fuel currently present in the fuel tank;
based on the user profile, determine information related to a fuel efficiency of the vehicle and the amount of fuel currently present in the fuel tank associated with the vehicle;
based on the information, determine a plurality of locations along the new route where fuel will be required by the vehicle; and
determine which of the plurality of fuel options near the plurality of locations should be used by the vehicle to drive along the new route in a cost-effective way.

15. The system of claim 14, wherein the determining which of the plurality of fuel options should be used by the vehicle in the cost-effective way is further based on user preferences.

16. The system of claim 15, wherein the user preferences include a fuel level in the fuel tank of the vehicle at which a user associated with the user profile normally stops for refueling.

17. The system of claim 14, wherein the determining which of the plurality of fuel options should be used by the vehicle in the cost-effective way is based on a past history of when fuel at the plurality of fuel options is cheaper.

18. A non-transitory computer-readable storage medium having computer-executable program instructions stored thereon that, when executed by a processor, cause the processor to:
receive a selection of a destination to which a vehicle is to be navigated;
determine a route to be traveled by the vehicle to reach the destination;
obtain first information related to a plurality of fuel options along the route and a plurality of prices of fuel offered at the plurality of fuel options;
obtain second information related to a fuel efficiency associated with the vehicle and an amount of fuel present in a fuel tank associated with the vehicle, wherein the amount of fuel present in the fuel tank is provided by an on-board diagnostic (OBD) system;
compare the first information with the second information to determine where along the selected route fuel will be required by the vehicle; and based on a result of the comparison, adjust the route to obtain a lowest cost way, using at least one of the plurality of fuel options along the route, to navigate the route with the vehicle.

19. The non-transitory computer-readable storage medium of claim 18, wherein the computer-executable program instructions further cause the processor to: transmit route information detailing the lowest cost way to navigate the route to a user device.

20. The non-transitory computer-readable storage medium of claim 18, wherein each of the plurality of fuel options comprises a gas station.

21. The non-transitory computer-readable storage medium of claim 18, wherein the adjusting the route to obtain the lowest cost way to navigate the route is further based on which of the plurality of fuel options is preferred by a user associated with the vehicle.

* * * * *